June 22, 1937.  H. J. SAUER  2,084,599
REFLECTING SIGNAL DEVICE
Filed Sept. 26, 1935
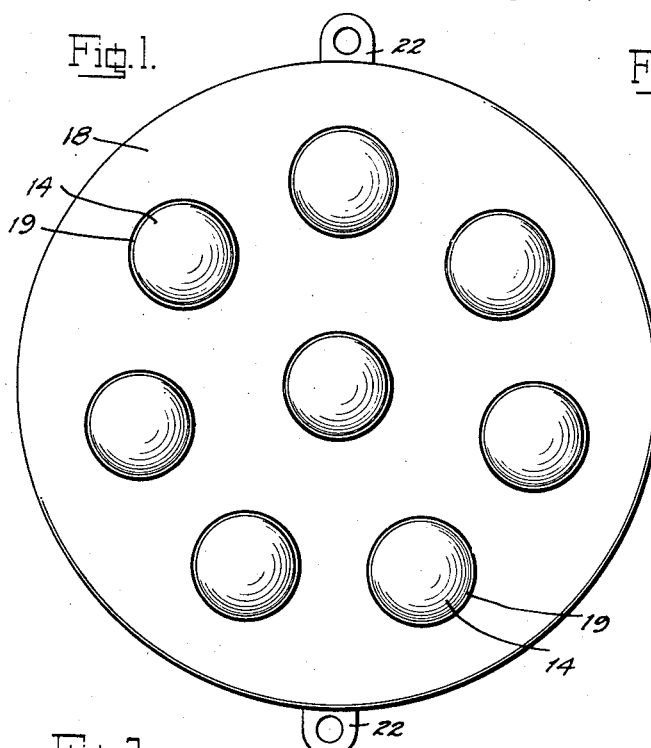
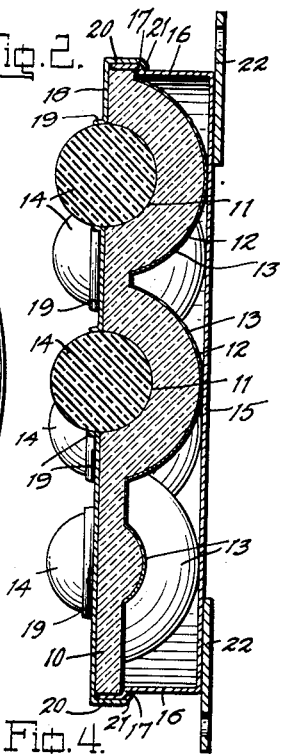
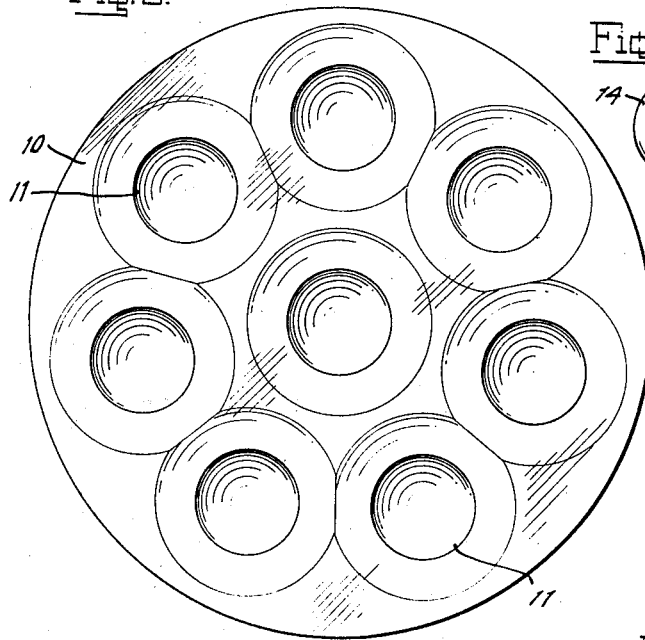
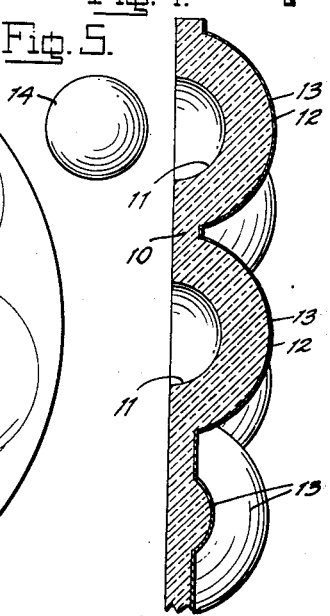
INVENTOR
HENRY J. SAUER.
BY
ATTORNEY Patented June 22, 1937

2,084,599

UNITED STATES PATENT OFFICE 2,084,599

REFLECTING SIGNAL DEVICE

Henry J. Sauer, Fairfield, Conn., assignor to The Kilborn-Sauer Company, Fairfield, Conn., a corporation of Connecticut Application September 26, 1935, Serial No. 42,197

4 Claims. (Cl. 88—82)

The present invention relates to an improved reflecting signal device, particularly of the autocollimating type in which rays of light from an outside source of illumination, such as the headlights of an automobile, are reflected back. The device is adaptable for use as a sign, a road signal, or as a signal to be placed upon the rear end of an automobile so as to signal following automobiles.

An object of the invention is to provide a reflecting signal device for reflecting a colored signal and at the same time having a high degree of luminosity, and to this end it is particularly proposed to provide a structure constructed partially of clear glass and partially of colored glass, the colored glass being in the form of a sphere and constituting the objective of the device and the clear glass being in the form of a concavo-convex structure, the concave surface having substantially the same radius as the sphere and adapted to receive it, and the convex surface adapted to constitute a concave reflecting surface, being preferably provided for this purpose with a mirror coating. In reflecting devices heretofore in use, and in which it was desired to produce a colored signal, the use of red or other colored glass throughout the structure greatly reduced the brilliancy, due to the presence of the coloring matter in the glass and the consequent loss in reflecting effect. According to the present invention the provision of a relatively large body of clear glass adjacent the reflecting surface in combination with the colored glass sphere produces reflected rays of greatly increased brilliancy.

A further object of the invention is to provide a signalling device in which the major portion of the structure is in the form of clear glass while the colored glass portion is in the form of glass spheres, so that the same clear glass structure may be used for producing signals of any desired color merely by the substitution of glass spheres of different colors, thereby greatly simplifying and economizing the production of the devices.

With the above and other objects in view an embodiment of the invention is shown in the accompanying drawing and this embodiment will be hereinafter more fully described with reference thereto, and the invention will be finally pointed out in the claims.

In the drawing:

Fig. 1 is a front view of a signal device, according to the exemplary illustrated embodiment of the invention.

Fig. 2 is a vertical sectional view thereof.

Fig. 3 is a front elevation of the clear glass socket and reflecting element employed.

Fig. 4 is a vertical sectional view thereof.

Fig. 5 is an elevation of one of the glass spheres employed.

Similar reference characters indicate corresponding parts throughout the several figures of the drawing.

Referring to the drawing, the reflecting signal device, according to the exemplary illustrated embodiment of the invention, comprises a plate-like glass body 10 preferably formed of clear glass, and which may be of any suitable shape or size depending upon the particular arrangement of the individual signal units, this body being provided at its front surface with a series of semi-spherical sockets 11 and provided at its rear surface with a series of convex spherical surfaces 12 axially aligned with the sockets 11 and having a radius approximately twice the radius of the sockets 11. The rear surface of the plate is preferably provided with a silver or other suitable mirror coating 13.

The sockets 11 are adapted to receive a series of glass spheres 14 of substantially corresponding radius to the sockets 11 so that they seat snugly therein, the glass spheres being preferably formed of colored glass and constituting the objectives of the individual reflecting units, the reflecting surfaces of which are the mirror coated convex rear surfaces 12. The relatively wide reflecting surfaces 13 are such as to provide a wide angular range of luminosity away from the normal axis line of the reflecting unit. In practice it has been found that the lens distance along the normal axis from the objective surface of the glass sphere 14 to the reflecting surface 13 should be approximately three times the radius of the glass sphere 14, and that the radius of the reflecting surface 13 should be twice the radius of the glass sphere 14.

The reflecting glass structure is preferably encased for protection, as well as to assemble the separate parts of the glass structure, and for this purpose I have shown a casing of circular form having a back portion 15 provided with a circular flange 16, shouldered, as at 17, to receive the periphery of the glass body. A cover member 18 having a plurality of flanged openings 19 in which the glass spheres are engaged is provided with a peripheral flange 20 engaged upon the flange 16 and curled over, as at 21, on the shoulder 17 to thereby assemble and secure the parts together. The flanges 19 are slightly convergent to conform to the curvature of the glass spheres, so that the latter are thus effectually held in place in the sockets 11. Brackets 22 are secured, as by spot welding, to the back of the casing for mounting the device upon a suitable supporting structure.

I have illustrated and described preferred and satisfactory embodiments of my invention, but it will be obvious that changes may be made therein, within the spirit and scope thereof, as defined in the appended claims.

Having thus described my invention what I claim and desire to secure by Letters Patent is:—

1. In an autocollimating reflecting signal device adapted to be illuminated by light rays directed thereto from the front, a glass body having a spherically curved socket in its front surface and having a convex dome upon its opposite surface in axial alignment with said socket and constituting a reflecting surface, the surface of said socket being clear to admit light rays therethrough and through said glass body to said reflecting surface, and a glass sphere of different color from said glass body removably seated in and completely filling said socket and constituting an objective through which said light rays from the front pass to said reflecting surface.

2. In an autocollimating reflecting signal device adapted to be illuminated by light rays directed thereto from the front, a glass body having a spherically curved socket in its front surface and having a convex dome upon its opposite surface in axial alignment with said socket and constituting a reflecting surface, the radius of said dome being approximately twice the radius of said socket, the surface of said socket being clear to admit light rays therethrough and through said glass body to said reflecting surface, and a glass sphere of different color from said glass body removably seated in and completely filling said socket and constituting an objective through which said light rays from the front pass to said reflecting surface.

3. In an autocollimating reflecting signal device adapted to be illuminated by light rays directed thereto from the front, a one-piece glass body having a plurality of spherically curved sockets in its front surface and having a plurality of convex domes upon its opposite surface in axial alignment with said sockets and constituting reflecting surfaces, the surfaces of said sockets being clear to admit light rays therethrough and through said glass body to said reflecting surfaces, and a plurality of glass spheres of different color from said glass body and each removably seated in and completely filling one of said sockets and constituting objectives through which said light rays from the front pass to said reflecting surfaces.

4. In an autocollimating reflecting signal device adapted to be illuminated by light rays directed thereto from the front, a one-piece glass body having a plurality of spherically curved sockets in its front surface and having a plurality of convex domes upon its opposite surface in axial alignment with said sockets and constituting reflecting surfaces, the surfaces of said sockets being clear to admit light rays therethrough and through said glass body to said reflecting surfaces, and a plurality of glass spheres of different color from said glass body and each removably seated in and completely filling one of said sockets and constituting objectives through which said light rays from the front pass to said reflecting surfaces, a casing for said glass body, and a cover plate secured to said casing having apertures of smaller diameter than said glass spheres in which said glass spheres are engaged and retained with respect to said glass body.

HENRY J. SAUER.